Figure 4:
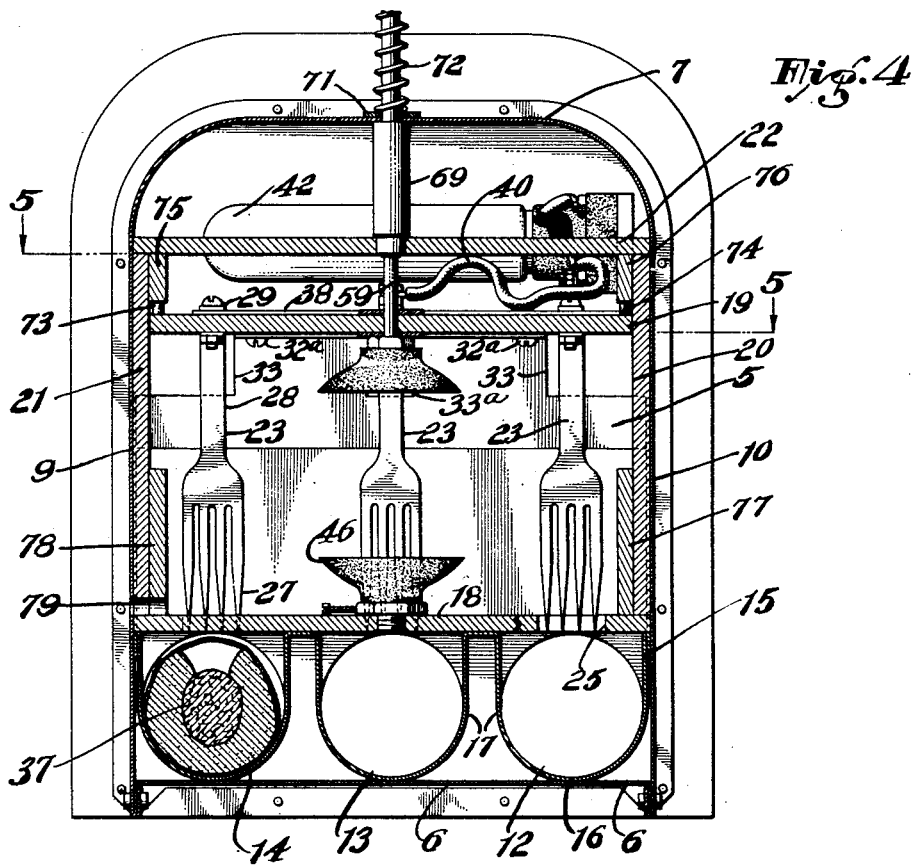

May 1, 1951 E. P. TYLER 2,550,889
BROILER
Filed Dec. 15, 1947 2 Sheets-Sheet 1
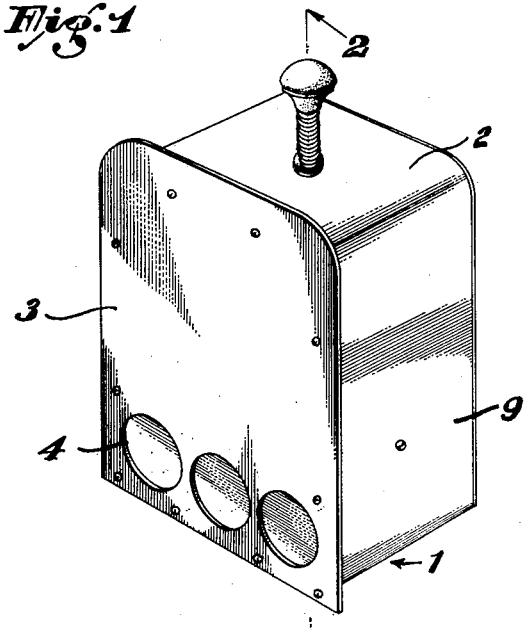
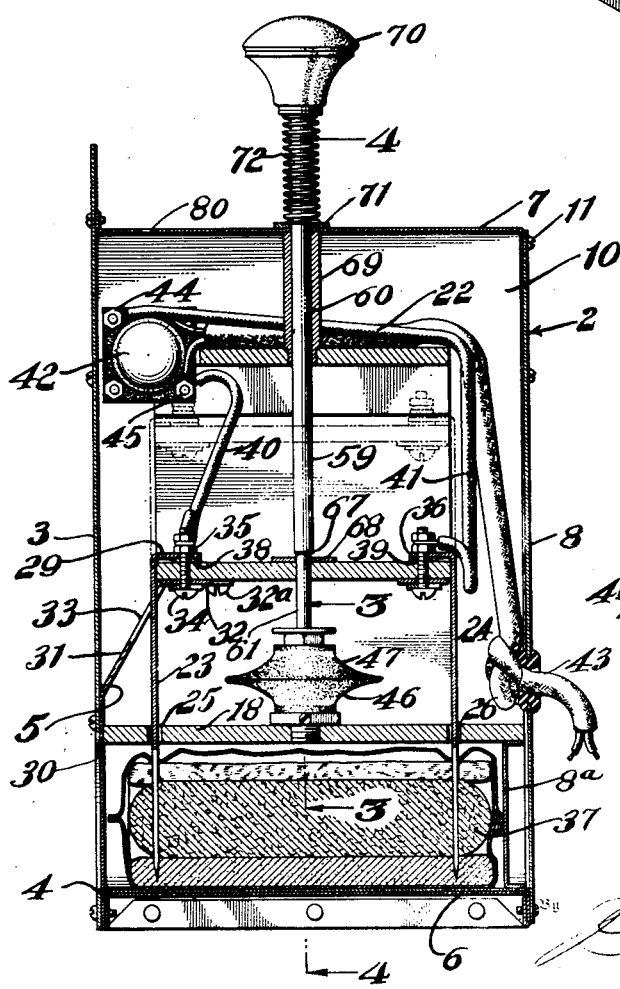
Inventor:
EDWARD P. TYLER;
Calvin Brown,
Attorney.

Inventor:
EDWARD P. TYLER;

By Calvin Brown,
Attorney.

Patented May 1, 1951

2,550,889

UNITED STATES PATENT OFFICE 2,550,889

BROILER

Edward P. Tyler, North Hollywood, Calif.

Application December 15, 1947, Serial No. 791,682

2 Claims. (Cl. 99—332)

The present invention relates to broilers of the type adapted to electrically cook an edible article such as, for instance, a wiener.

The invention has for an object the provision of a broiler of compact nature, which may be placed on a store counter, is of attractive appearance, and will broil a food article within a few minutes.

The present invention is so constituted and arranged that a wiener and a bun encased within a bag, may have the entirety placed within a compartment of the broiler and cooked.

The entire food article is maintained in a sanitary condition, cooked in a sanitary manner with only the hands of the purchaser of said article removing the food article from its bag or wrapper after such cooking. It is a notorious fact that most stands that sell wieners for placement in buns do all the cooking of the wieners in the open, with the food exposed to dirt and dust from the street and elsewhere, the fingers of the cook break the wieners apart, fingers open the buns, with the likelihood of communicating disease to others. With the present invention, the buns with their wieners therein may be prepared under sanitary conditions in a kitchen and enclosed within a sanitary bag without the hands touching the food article. This sanitation is maintained by the delivery of the food articles to a store and its method of cooking.

In the practice of the present invention, I have provided a small casing of ornamental appearance, and which requires little room on a counter.

The food articles are maintained in a fresh condition within their wrappers and not pre-cooked, as is generally the practice. Therefore, with the present invention, the food article, or at least a portion thereof, to-wit, the wiener, is uncooked until placed within the broiler, whereupon it is rapidly and completely cooked. Thus, the food article has all of its flavor and aroma maintained therein.

A further object of the invention is the provision of a broiler which incorporates a novel form of timing arrangement whereby the food article is properly cooked.

A further object of the invention is the provision of a broiler wherein the food article is enclosed and not accessible during a cooking thereof.

A further object is the provision of a device which is simple in construction, inexpensive in cost of manufacture, and superior to broilers now known to the inventor.

With the above mentioned and other objects in view, the invention consists in the novel and useful provision, formation, construction, association, and relative arrangement of parts, members and features, all as shown in a certain embodiment in the accompanying drawings, described generally, and more particularly pointed out in the claims.

Figure 5:
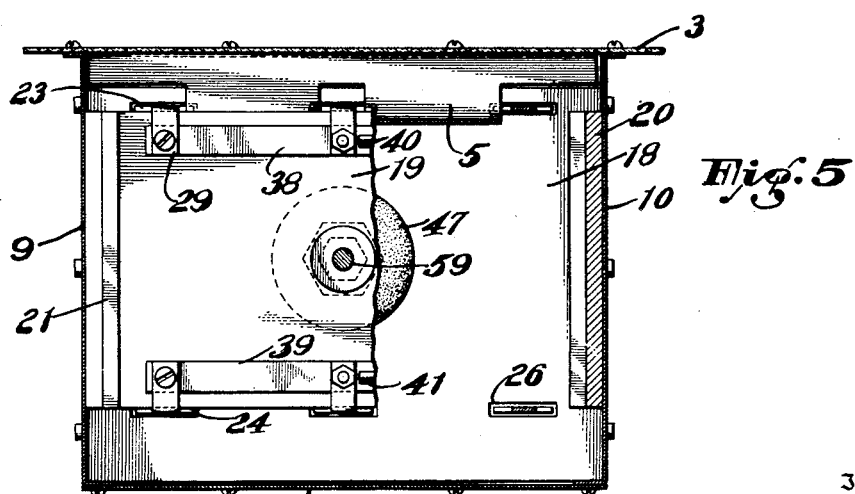

In the drawings:

Figure 1 is a perspective view of one form of the broiler,

Figure 2 is a sectional view on the line 2—2 of Figure 1, and on an enlarged scale, Figure 3 is a sectional view on the line 3—3 of Figure 2, and on an enlarged scale, Figure 4 is a sectional view on the line 4—4 of Figure 2, certain of the elements of the invention being in a changed relationship, and Figure 5 is a fragmentary, partly sectional view, on the line 5—5 of Figure 4.

Referring now with particularity to the drawings, the food broiler is designated as an entirety by 1, and the same has a casing 2 provided with an ornamental type front wall 3, which may be formed of a translucent material, such as a colored plastic, and which front wall is of greater height and breadth than the other walls of the casing so as to provide a marginal flange portion, as illustrated in Figure 4. The front wall is provided with one or more openings 4 adjacent the base portion of the casing, and which openings lead to compartments within which the actual broiling of the food occurs. It will be observed in Figure 1 that the openings 4 appear closed. Such closure is accomplished by means of a curtain or slide 5 (see Figure 2). The curtain closes the openings so as to prevent access to the compartments within the casing during a broiling operation. The casing has a base 6, top 7, rear wall 8, as well as side walls 9 and 10. All of said walls are secured together in any approved manner, such as by means of screws as illustrated, for instance, at 11. The casing is preferably formed of sheet metal, which may be flanged to allow ready connection between the several walls thereof, as best illustrated in Figure 2. No particular claim is laid to originality as to the casing per se, although the inventor believes that the front wall 3 may be new in the art of broilers.

It is intended, and as a preliminary statement, that said front wall should be alternately illuminated in order to attract attention to the casing and thereby promote sales of the food product to be broiled therein. As stated, the casing is arranged to provide one or more compartments for the reception of food which is to be broiled.

In the embodiment of the invention shown, I have provided three compartments, as illustrated at 12, 13, and 14. To form the compartments, a strip of sheet metal 15 of the depth of the casing is bent to form the compartments with all compartments separated by bending the metal to provide round base portions 16, and spaced, interconnected side walls 17. Thus, the sheet metal is so bent as to provide substantially U-shaped compartments, the top wall for each compartment being formed by providing a wall 18 which extends horizontally between the casing front, rear and side walls. The top wall 18 is preferably formed of insulation material so as to confine any heat to the compartments. Positioned within the casing and above the top wall 18 is an elevator platform 19, which platform extends between two guide walls 20 and 21 formed of insulation material. Walls 20 and 21 are secured to the side walls 9 and 10 of the casing and rest at one end upon the top wall 18. A wall 22 extends between the two walls 20 and 21. Thus, it will be seen that the elevator platform 19 is interposed between the guide walls 20 and 21, the top wall 18, and the wall 22. The elevator platform 19 is formed to carry pairs of front and rear forks 23 and 24. There is one pair of forks for each food compartment, and reference to Figure 2 shows that the top wall 18 is provided with slots 25 and 26 for each food compartment and through which slots are passed the forks 23 and 24. The forks are conventional and have tine portions 27, which merge with the handle or shank portions 28. The shank portions are angularly bent at 29. It will be observed that the major portion of the shank of each fork, together with its tines, lie in the same plane, while the angular portion 29 is adapted to overlie the top surface of the elevator platform and is carried thereby as hereinafter described.

The curtain or slide 5, which closes entrance to the compartments, comprises a wall having a portion 30 paralleling the front wall 3 of the casing, and a portion 31 at an angle to portion 30 and provided with a part 32 which engages the under surface of the elevator platform 19 and is held thereto by screws 32ª. The portion 31 is reduced in width at 33 and slotted at 33ª to accommodate the shank portions of the forks 23. Screws 34 are passed through the bent portions 29 of the fork shanks, and secured by nuts 35. The rear forks 24 are secured to the elevator platform in the same manner as the front forks, as indicated at 36 for such an arrangement. It is evident from the description so far given that a raising or lowering of the elevator platform will raise or lower the forks and the curtain or slide. For instance, in Figure 2, the forks have been lowered so that the tines impale or penetrate a food item designated generally as 37, within one of the compartments. When the food item is impaled by the tines of the two forks, the curtain or slide has been lowered so that the portion 30 thereof closes entrance to the compartment, through one of the openings 4. On the other hand, when the elevator platform is in the position shown in Figure 4, the tines are within the confines of the casing above the top wall 18 and the curtain or slide is raised to permit entrance within each food compartment. Depending upon the number of pairs of forks to be utilized, which number depends upon the number of food compartments, I interconnect all of the front fork screws 34 by a bus bar 38, and I do the same for the rear assemblage of forks, as shown for the bus bar 39. There is a lead 40 from the front forks and bus bar and a lead 41 for the rear forks and bus bar. In the present instance, I provide a blinker light at 42 which is adjacent the translucent front wall 3, and a cable 43 connects with the socket for said blinker light and with the leads 40 and 41, as shown in Figure 2, at 44 and 45. The cable 43 extends outwardly of the rear wall 8 of the casing, and is adapted, by means of a plug, to connect with a source of electric supply. This source is usually 110 to 115 volts, A. C. or D. C.

As mere manual raising and lowering of the elevator platform is not feasible, as it would be difficult to determine the exact cooking time for a food article, I have provided a timer. While any type of timer may be used, I have found that the timer illustrated performs satisfactorily without attention over a long period of time. The present timer comprises a pair of flexible cups 46 and 47, substantially frusto-conical in vertical section, with the base portions slightly concaved, as shown at 48 and 49. The lower cup 46 is secured to the top wall 18 and is immovable, whereas the top cup 47 is movable. The two cups have a common axis, the concave faces thereof being in opposed relationship, as illustrated in Figure 3. It is apparent that if the two cups are pressed together, air is expelled from between the contacting surfaces and the cups will remain together unless air is allowed to flow therebetween. As a consequence, I have provided a metering arrangement whereby air may be received between the two cups to effect separation thereof after a given interval of time. The cup 46 has molded therein a flanged screw 50, the shank portion of which extends beyond the base 51 of said cup, and which screw is provided with an axial bore 52, communicating with an axial bore 53 in the cup 46. Bore 53 communicates with the concave face 49. Screw 50 is threaded within screw 54, which has an enlarged head 54ª, with the external threads of screw 54 in engagement with a threaded bore in the top wall 18. The head 54 is provided with a port 55, which communicates between the central threaded bore 56 and a transverse threaded bore 57. The threaded bore 57 receives a needle valve 58. The arrangement is such that the conical end of the needle valve may close the port 55. It is apparent that adjustment of the needle valve will control the amount of air received between the two cups 46 and 47 when the cups are in cooperative relationship, as shown in Figure 3.

The cup 47 is carried by a stem 59. The stem has an elongated portion 60 of one diameter and a portion 61 of reduced diameter. The reduced diameter portion is secured to the cup 47. In the present instance, this is accomplished by embedding within the cup 47, a screw 62, which screw is received within a tapped bore 63 in the end of the reduced portion 61 of the stem. Stability of the structure is assured by providing a nut 64 externally secured on thread 65 of said stem, and a washer 66 positioned above the nut. The nut substantially overlies the top of the cup, as best illustrated in Figure 3. By providing the stem with two portions of different diameter, a shoulder 67 results. Carried on the top surface of the elevator platform and surrounding the reduced portion 61 of the stem is a washer 68. Extending between the wall 22 and the top 7 of the casing is a sleeve 69 and passed through said sleeve is the portion 60 of the stem. The stem extends outwardly and beyond the top 7 and terminates in a knob 70. Interposed between said knob and a washer 71 on the external surface of top 7, and surrounding the stem, is a coiled spring 72. The coiled spring normally urges the stem in one direction, to-wit, upwardly.

The operation, uses and advantages of the invention just described are as follows:

It is assumed that the food article to be cooked comprises a wiener interposed between the halves of an elongated bun, as illustrated in Figures 2 and 4; such a food article may be protected by enclosing the same within a transparent envelope, as illustrated. Such an envelope will maintain the food article in a sanitary condition, not only prior to cooking but during the cooking operation and thereafter. Assuming that the stem 59 is elevated or in the position shown in Figure 4, being urged to this position by the coil spring 72, the forks are all positioned above the compartments 12, 13 and 14 which normally receive the food articles. In the position of Figure 4, the curtain or slide 5 is elevated to allow access within the food compartments. One or more of the food articles enclosed within bags or envelopes are then inserted within the compartments. In the present instance, I provide a sub rear wall 8ª spaced inwardly from the rear wall 8 of the casing, and against which the food article is pressed. The wall 8ª limits inward movement of the food article and positions the food article for penetration by the forks. After the food article is positioned within a compartment, the operator depresses the stem by pushing downwardly upon the knob 70 to bring the two flexible cups 46 and 47 into engagement. Such a depression of the stem will move the elevator platform downwardly to cause the front and rear forks to penetrate spaced portions of the food article, as illustrated in Figure 2. The shoulder portion 67 of the stem contacts the washer 68 which rests on the top surface of the elevator platform and causes a lowering of the elevator platform. An electrical path is provided between the tines of the two forks due to the fact that the average wiener or frankfurter is salty and likewise moist. It has been found that there is sufficient electrical resistance in a food article of this character to prevent a fuse from being blown. By adjusting the needle valve, air will gradually bleed past the screw-threads 57, through port 55, the screw-threads between the screw 50 and threads 56 into the bore 52, the port 53 to the space included between the two concave faces of the cups 46 and 47 (see Figure 3). Under urgency of the spring 72, the stem gradually moves upwardly which, however, causes no movement of the elevator platform because the stem has a reduced diameter portion 61 which permits such movement. After a given amount of air is received between the two cups, separation suddenly occurs, which causes washer 66 to abruptly contact the lower surface of the elevator platform to move the same from the position of Figure 2 to that of Figure 4. To prevent shock damage to the elevator platform, I provide bumpers at 73 and 74. These bumpers may be secured directly to the wall 22 or to spacer members 75 and 76. To limit downward movement of the elevator platform 19, stop plates 77 and 78 are provided, which are carried by the wall 18. Air is permitted entrance within the casing through ports 79 and 80.

By experimentation, the cooking time for any food article may be readily determined, and when determined, the needle valve is adjusted to allow a timed bleed of air between the two cups 46 and 47.

I have, by the device just described, provided a simple type of broiler, easily constructed, and substantially fool proof in operation. Actual results show that the wiener within its elongated bun retains its moisture, is tasty, and thoroughly cooked. Wieners which are fried lose a great deal of their flavor and the same is true for wieners that are cooked in hot water. It only requires a matter of a minute or so to thoroughly cook the food article, and it is delivered from the compartment in a very hot condition. Thus, by the supplier of the food article properly processing the article, that is to say, by adding mustard and other condiments, it is possible to retain the food article in a fresh condition for a period of time, something that is quite impossible of accomplishment when the ingredients are combined after cooking the wiener separately.

I claim:

1. A broiler including a casing having a front wall, food compartments within the casing, the front wall being provided with openings permitting entrance to each food compartment, a transversely extending elevator platform within the casing, and pairs of forks carried by said elevator platform, there being a pair of forks for each compartment member; a curtain carried by the elevator platform, the said curtain closing entrance through the openings in the front wall of the casing to said compartments upon a lowering of the elevator platform to position pairs of forks within each compartment member; a timer device for maintaining said forks within the compartment members, and means for raising the elevator platform after a given time interval as determined by said timer device, and to raise the forks from said compartment members and elevate the curtain.

2. A broiler having a plurality of enclosed food compartments each opening through an end wall thereof, an elevator platform within the casing extending transversely above the enclosed compartments, pairs of spaced forks for each compartment carried by the elevator platform, means for guiding the forks transversely within and entirely across each food compartment upon depression of the elevator platform within the casing, closure means for the end wall openings of the compartments operable upon depression of the elevator platform, a mechanical timing device operable to maintain the elevator platform depressed a determined time, and means for raising the platform and withdrawing the forks and closure means after the determined time interval.

EDWARD P. TYLER.

REFERENCES CITED

The following references are of record in the file of this patent:

UNITED STATES PATENTS

| Number | Name | Date |
| --- | --- | --- |
| 1,754,574 | Sater | Apr. 15, 1930 |
| 2,152,208 | Nelson | Mar. 28, 1939 |
| 2,251,925 | Edmunds et al. | Aug. 12, 1941 |
| 2,274,325 | Ford | Feb. 24, 1942 |
| 2,287,956 | Aff | June 30, 1942 |
| 2,374,302 | Orkfritz | Apr. 24, 1945 |